United States Patent [19]
Walsh et al.

[11] Patent Number: 5,560,860
[45] Date of Patent: Oct. 1, 1996

[54] WATER-BASED PAINT SPRAY BOOTH FLOOD SHEETS AND METHODS OF RECLAIMING PAINT USING THE SAME

[75] Inventors: William C. Walsh, Archbold, Ohio; Lawrence E. James, Grosse Ile, Mich.

[73] Assignee: BASF Corporation, Mt. Olive, N.J.

[21] Appl. No.: 371,390

[22] Filed: Jan. 11, 1995

Related U.S. Application Data

[62] Division of Ser. No. 222,564, Apr. 4, 1994, Pat. No. 5,466,300, which is a division of Ser. No. 970,330, Nov. 2, 1992, abandoned.

[51] Int. Cl.$^6$ .......................... B01D 47/02; C09D 9/04; C11D 7/50
[52] U.S. Cl. .................. 252/60; 55/228; 55/DIG. 46; 95/195; 134/38; 252/364; 510/206
[58] Field of Search ...................... 252/153, 162, 252/170, 171, 364, 542, DIG. 8, 173; 134/38; 55/85, 89, 228, DIG. 46; 95/195

[56] References Cited

U.S. PATENT DOCUMENTS

| | | | |
|---|---|---|---|
| 4,836,950 | 6/1989 | Madsen et al. | 252/153 |
| 5,006,279 | 4/1991 | Grobbel et al. | 252/542 |
| 5,015,410 | 5/1991 | Sullivan | 252/166 |
| 5,019,138 | 5/1991 | Farrah et al. | 55/DIG. 46 |
| 5,024,780 | 6/1991 | Leys | 252/162 |
| 5,035,829 | 7/1991 | Suwala | 252/170 |
| 5,098,450 | 3/1992 | Patzelt et al. | 55/45 |
| 5,124,062 | 6/1992 | Stevens | 252/162 |
| 5,188,675 | 2/1993 | Dormon-Brailsford | 134/4 |
| 5,232,515 | 8/1993 | Sullivan | 252/542 |
| 5,334,255 | 8/1994 | James et al. | 134/38 |
| 5,401,326 | 3/1995 | Mihelic et al. | 252/153 |

FOREIGN PATENT DOCUMENTS

| | | |
|---|---|---|
| 389829 | 10/1990 | European Pat. Off. . |
| 431429 | 6/1991 | European Pat. Off. . |
| 88/06640 | 9/1988 | WIPO . |

OTHER PUBLICATIONS

McCutcheon's *Emulsifiers & Detergents* North American Edition 1982 p. 202.

*Primary Examiner*—Linda Skaling Therkorn
*Attorney, Agent, or Firm*—Nixon & Vanderhye P.C.

[57] ABSTRACT

A composition for reclaiming paint and volatile organic paint carrier from industrial paint spray booths without increasing VOCs has been developed. The improvement over the existing booths recirculating hydrophilic based fluids, is the inclusion of a water based solution containing about 10 to about 45 per cent by weight of one or more N-alkyl pyrrolidones, about 15 to 40 percent by weight of one or more alkyl glycol mono alkyl ethers, a surfactant present in the amount of about 0.1 to 2.0 percent by weight, and the balance water.

8 Claims, No Drawings

WATER-BASED PAINT SPRAY BOOTH FLOOD SHEETS AND METHODS OF RECLAIMING PAINT USING THE SAME

This is a divisional of application Ser. No. 08/222,564, filed Apr. 4, 1994 now U.S. Pat. No. 5,466,300 which in turn is a divisional of application Ser. No. 07/970,330 filed Nov. 2, 1992 (now abandoned).

BACKGROUND OF THE INVENTION

1. Field of the Invention

The present invention relates to water-based paint booth flood sheet solutions, and more specifically to water-based paint booth flood sheet solutions with an aprotic heterocyclic oxygenate, an alkyl aryl glycol monoalkyl ether and a surfactant.

2. Description of the Prior Art

It has been taught that various compounds materials can be used, in place of water, as atomized paint particle knock-down media in large industrial paint spray booths.

The air in the paint spray booth that contains these paint overspray particles is pulled through grating in the bottom of the booth into and through a "curtain" or flood sheet of fluid that traps some of the paint particles as an initial step in purification clearing of the air prior to allowing the air to pass out through an exhaust stack into the outside environment.

In general, water has been used as the medium in the large (100,000–200,000 gallons) flood sheet systems. However, U.S. Pat. No. 4,339,248 teaches the use of a water insoluble, high boiling plasticizer type of material as the paint-catching medium. The use of a long chain of polyether, as the paint-catching medium is disclosed in U.S. Pat. No. 4,102,303. In addition, U.S. Pat. No. 4,919,691 teaches the use of a high boiling oil and dibasic ester, and water emulsion as a flood sheet composition.

The prior art attempted to improve over the use of water at cleaning paint particles out of the air stream that passed through it. However, in all cases, the materials used were high boiling materials.

However, these methods do not work in the reclamation of uncured paint resin. The inclusion of these high boiling materials, which do not evaporate even at the temperatures that the paints normally crosslinked, does not work. The paint left in the "high boiling" sludge, after a distillation process, cannot be cured into a paint film. The result is cured chunks of paint floating in pools of the high boiling compounds.

Rather than the expensive process of continually disposing of the high boiling paint catching compounds, once they had reached a paint saturation point, it has been known to include detackifying compounds to chemically cure the paint into hard powder particles which float to the surface of the paint catching medium and can then be easily separated. The detackified or chemically cured paint particles are no longer capable of being recycled and used as a paint. They are fully cured resin particles that are waste and require disposal.

A further improvement over the use of these high boiling water insoluble compounds as the paint catching media, is disclosed in U.S. Ser. No. 07/445,314, herein incorporated by reference. A lower boiling water based solution of, for example, N-methyl pyrrolidone, tripropylene glycol mono methyl ether, di basic ester, and water is used. This type of water based solution allows the paint to be caught and solvated, without the inclusion of a detackifying agent. The paint resin is then easily recovered, via a distillation process at temperatures lower than those at which the paints cure, giving rise to a final product that is not disposed of as waste, but is in a form that can be re-used as a film forming paint.

In view of the current environmental and regulatory climate, it is important to further reduce volatile organic emissions in the flood sheet spray booth. A large amount of agitation is associated with the keeping of the flood sheet fluid in continual motion. This causes an increase in the amount of volatile organic emissions being given off by the flood sheet fluid.

Therefore, in spite of these disclosures, there is a need for a water-based flood sheet solution that would trap paint overspray particles, without the inclusion of a detackifying agent, and at the same time have a lower volatile organic emissions.

BRIEF SUMMARY OF THE INVENTION

A composition and process for reclaiming paint and volatile organic paint carrier from industrial paint spray booths without increasing VOCs and without the use of a detackifying agent has been developed.

The improvement over the existing booths in which hydrophilic based fluids are recirculated is the inclusion of a water based solution containing about 10 to 45 per cent by weight of an N-alkyl pyrrolidone; about 15 to 40 percent by weight of an alkyl glycol mono alkyl ether, a surfactant present in the amount of about 0.1 to 2.0 percent by weight and the balance water.

This type of flood sheet fluid, allows for the reclamation of the paint, that is removed from the air, via a distillation process at temperatures that do not cure the paint, thus allowing the paint resin to be re-used. By using this fluid, a lower level of volatile organic emissions is attained than when other hydrophilic fluids, which also allow for paint reclamation and re-use, are used.

DETAILED DESCRIPTION OF THE PREFERRED EMBODIMENTS

As used herein paint spray booth(s) mean a device having a paint spraying chamber, an air movement/duct system that allows for air to pass through the chamber thereby catching in the air any paint and carrier that does not attach itself to the substrate being painted, a sump system at the bottom of the booth that recirculates a hydrophilic fluid to catch the paint and solvent carrier that is in the air prior to the air exiting the spray booth construction.

We have discovered a composition and process for the improvement of the state of the art water flood sheet technology that allows for the reclaiming of paint for re-use as film forming coatings. The new process involves the replacement of the water flood sheet fluid, containing compounds which chemically alter the paint, so that the paint cannot be further used as a "paint" or film forming coating.

In the present invention, the solvated paint in the solvent water solution will remain as a dissolved resin system, which is still capable of being used as a film forming paint.

The solvent/water solution of the present invention may be continually fed into an on site distillation unit. This allows for the re-use of the flood sheet solution components as well as for the collection of the paint resin system for eventual re-processing into film forming paint.

The composition of the present invention eliminates the need for the addition of chemical defoamers to the flood sheet fluid. The current water flood sheets, as well as the emulsion flood sheet of the prior art, require defoaming agents to be added to the flood sheet sump on a continuous basis.

The vapor pressure of the solution in the present invention is lower than that of the prior art solutions. The result of this lower vapor pressure is a reduction of the volatile organic compounds being emitted into the atmosphere from the solution.

One of the differences between the current invention and the prior art, concerns the fact that the paint overspray is being trapped out of the air, and then concentrated via a method that does not destroy the ability of the paint to chemically crosslink into a cured polymer.

The prior art required that a detackifying agent be added to the water, that was catching the paint, so that the paint resin which was water insoluble would not attach itself to all surfaces that it came into contact with. These detackifying agents usually created alkaline conditions that chemically cured the paint. The paint resin was no longer tacky, but it could not be re-used as a resin in a paint or adhesive formulation.

When the paint is added to the flood sheet outlined in the present invention, the resin is solvated by the solution, and is rendered non-tacky. No chemical reaction occurs. Thus, the paint resin is still in a form that can be utilized as a paint or adhesive resin.

When this resin is concentrated in a manner that does not subject the resin to a temperature of 145° C., the resin system does not crosslink, leaving open the option for using the concentrated resin for re-formulating into other products.

The flood sheet solution used in this process comprises a solution of N-alkyl pyrrolidone, and most preferably N-methyl pyrrolidone (NMP). For convenience of description, this component will be identified as NMP.

The preferred solvents should be economical and have the appropriate volatility. The solvent used should be volatile, and hence, the most completely recovered during the distillation process.

It is preferred that the N-alkyl pyrrolidone be present in the composition in an amount of about 10.0 to about 45.0 percent, by weight, and more preferably about 20.0 to about 30.0 percent, by weight.

The vapor pressure of NMP is depressed when mixed with water, but this phenomenon is reversed as the water is removed during the initial part of the distillation. The result of the vapor pressure of NMP and its relationship to moisture content, allows for both low NMP evaporation rates while the paint booth circulation system is in operation, as well as for a cleaner separation of the NMP and water during the distillation.

During use of the flood sheet spray booth, water begins to evaporate out of the flood sheet solution, the vapor pressure of the NMP begins to increase at a rate that is proportionate to the amount of water left in the distillate. The NMP will thus not begin to distill over, until most of the water is already separated out.

In addition to NMP, it is preferred that compounds having propylene oxide monomer units terminated at each end with a hydroxy group be used in the composition.

Suitable compounds include one or more alkyl glycol mono alkyl ethers, having an alkyl glycol oligomer portion containing 1, 2 or 3, $C_1$ to $C_8$ repeating units which are terminated at each end by a hydroxy group, and wherein the alkyl moiety of the alkyl ether portion has 1 to 4 carbon atoms.

For example, mono alkyl ether derivatives having one to four carbon atoms in the alkyl moiety may be used. More preferably, tripropylene glycol mono methyl ether is used. The amount of the alkyl glycol mono alkyl ether used is generally from about 15 to about 40 percent by weight, preferably from about 20 to about 30, by weight.

Solvents that are also suitable include n-butoxy ethanol, triethylene glycol phenyl butyl ether, propylene glycol phenyl butyl ether, and dipropylene glycol-N-butyl ether, dipropylene glycol mono methyl ether and the like.

It is most preferred that the N-alkyl pyrrolidone and the alkyl glycol mono alkyl ether be present in the composition in an amount substantially the same by weight. The most preferred amounts for each of the components are about 20 to about 30 percent by weight.

The surfactant constituent is present in the invention because it was unexpectedly discovered that with the surfactant present in the solution, the actual vapor pressure of the fluid was less than the actual vapor pressure of the solution with the surfactant not present. The non-ionic surfactant type preferred is biodegradable and should be compatible with NMP and alkyl glycol mono alkyl ether.

It is most preferred that the non-ionic surfactant be a linear alcohol alkoxylate. The linear alcohol alkoxylate of choice is commercially available as PLURAFAC® RA-40 (BASF Corporation), and is generally used in the amount of from about 0.1 to about 2.0 weight percent, preferably from about 0.5 to about 1.0 weight percent.

In using the above-described composition and process, the chemicals which are placed into the current water flood sheets will not be required for the maintenance of a stable paint booth re-circulation system. However, these chemicals, which include, for example, fungicides, bactericides, defoamers, flocculates and detackifers, should be readily soluble in solutions of the present invention, with no decrease in the chemical activity associated with said chemicals. Thus, they can be used as desired and/or needed, without changing the scope of the instant invention.

The following examples serve to further illustrate the present invention and should in no way be construed as limiting the scope thereof.

EXAMPLE 1

A flood sheet fluid having the following formulation was prepared.

|  | Weight Percent |  |
| --- | --- | --- |
| N-Methyl Pyrrolidone | 29.0 × 20 | 580.0$_g$ |
| Tripropylene glycol mono methyl ether (TPM) | 29.0 × 20 | 580.0$_g$ |
| Plurafac ® RA-40 | 0.6 × 20 | 12.0$_g$ |
| Water | 41.4 × 20 | 828.0$_g$ |
| TOTAL |  | 2000.0$_g$ |

Preparation

The N-methyl pyrrolidone, TPM, and Plurafac® RA-40 were added to the mixing vessel. The order of addition was not critical. These components were mixed at a slow speed for approximately 15–20 minutes. After these components were mixed, the water was then added to the mixing vessel and the entire formulation was then mixed at a slow speed for an additional 2 minutes.

EXAMPLE 2

Four hundred grams of the solution described in Example 1 was weighed into a 1000.0 ml pyrex beaker. A 2 inch magnetic stirring bar was added to the beaker also. Weighed into the flood sheet solution was 40.0$_g$ of BASF Corporation automotive clear coat paint #E04CK303 (a melamine crosslinked thermoset acrylic, containing as part of its solvent package xylene, Aromatic 100, n-butanol, and methyl ethyl ketone). The mixture of paint and flood sheet solution was blended at a medium speed with a magnetic stirrer, for 20 minutes.

After 20 minutes, the mixing was discontinued, and the mixture was poured into a 500 ml pyrex distillation pot. A one inch stirring magnetic was added to the pot also. The pot was then placed into an insulated electric heating jacket, and the jacket assembly was placed onto a magnetic stirrer.

The pot/heating jacket assembly was attached to a 12 inch tall pyrex reflux column that was insulated with fiberglass matte. The top of the reflux column emptied into a 12 inch long water jacketed, distillate condensation tube, that emptied into a 500 ml condensate collection pot assembly in order to apply a vacuum on the whole system.

A vacuum of 50 mm Hg was applied to the system, and the temperature was gradually raised up to 120° C.±2° C. The temperature was maintained at 120° C.±2° C. for 80 minutes, and then the distillation process was shutdown.

During the entire process of heating and distilling the paint/flood sheet mixture, the distillation pot was agitated with the magnetic stirrer at a medium speed. The 50 mm Hg vacuum was applied to the system for the entire duration of the heating and distillation process.

Some of the paint and solvent (122.7 g) was retained in the distillation pot at the end of the distillation. This paint was saved in a sample bottle for use in a paint cure test.

EXAMPLE 3

Four hundred grams of the solution described in Example 1 was weighed into a 1000.0 ml pyrex beaker. A 2 inch magnetic stirring bar was added to the beaker also. Weighed into the flood sheet solution was 40.0 g of BASF Corporation automotive paint, Flame Red #E55RD021 (a crosslinked thermoset polyester urethane with part of its solvent package consisting of water, n-butanol, and Aromatic 100.) The mixture of paint and flood sheet solution was blended with a magnetic stirrer, at a medium speed for 20 minutes.

After 20 minutes, the mixing was stopped, and the mixture was poured into a 500 ml pyrex distillation pot. A one inch stirring magnet was added to the pot also. The pot was then placed into an insulated electric heating jacket, and the jacket assembly was placed onto a magnetic stirrer.

The pot/heating jacket assembly was attached to a 12 inch tall pyrex reflux column, that was insulated with fiberglass matte. The top of the reflux column emptied into a 12 inch long, water jacketed, distillate condensation tube, that emptied into a 500 ml pyrex condensate collection pot. A vacuum hose was attached to the condensate collection pot assembly in order to apply a vacuum on the whole system.

A vacuum of 50 mm Hg was applied to the system, and the temperature was gradually raised to 121° C.±2° C. The temperature was maintained at 121° C.±2° C. for 120 minutes, after which time, the distillation process was shutdown.

During the entire duration of the heating up and distilling of the paint/flood sheet mixture, the distillation pot was agitated with the magnetic stirrer at a medium speed. Also, the 50 mm Hg vacuum was applied to the system for the entire duration of the heating up and distillation process.

Some of the paint and solvent (112.97 g) was retained in the distillation pot at the end of the distillation. This paint was saved in a sample bottle for use in a paint cure test.

EXAMPLE 4

Four hundred eight grams of the solution described in Example 1, was weighed into a 1000.0 ml pyrex beaker. A 2 inch magnetic stirring bar was added to the beaker also. Weighed into the flood sheet solution was 40.8 g of BASF Corporation automotive paint, Flash Red #E174RE022 (a melamine crosslinked thermoset acrylic, containing as some of its solvent package xylene, Aromatic 100, n-butanol and methyl ethyl ketone). The mixture of paint and flood sheet fluid was blended with a magnetic stirrer, at a medium speed for approximately 20–25 minutes.

After the 20–25 minutes of mixing, the magnetic stirrer was shut off, and the mixture was poured into a 500 ml pyrex distillation pot. A one inch stirring magnet was added to the pot also. The pot was then placed into an insulated electric heating jacket, and the jacket assembly was placed onto a magnetic stirrer.

The pot/heating jacket assembly was attached to a 12 inch tall pyrex reflux column, which was insulated with fiberglass matte. The top of the reflux column emptied into a 12 inch long, water jacketed, distillate condensation tube, that emptied into a 500 ml pyrex condensation collection pot. A vacuum hose was attached to the condensate collection pot assembly, in order that a vacuum could be applied to the whole system.

A vacuum of 50 mm Hg was applied to the whole system, and the temperature was gradually raised to 120°–122° C. The temperature was maintained at 120°–122° C. for 105 minutes, after which time, the distillation process was shutdown.

During the entire duration of the heating up and distilling of the paint/flood sheet fluid mixture, the distillation pot was agitated with the magnetic stirrer at a medium speed. Also, the 50 mm Hg vacuum was applied to the system for the entire duration of the heating up and distillation process.

Some of the paint and solvent (135.0 g) was retained in the distillation pot at the end of the distillation. This paint was saved in a sample bottle for use in a paint cure test.

EXAMPLE 5

The following paint cure test were carried out to demonstrate the fact that the paint, which had been added to the flood sheet solution and concentrated via distillation, still maintained the ability to crosslink into polymeric films. Thus, it still is in a form that is useful for re-formulation into coatings or adhesive systems.

Three 3 inch×5 inch×⅛ inch pieces of mild steel were placed into a room temperature (25° C.) bath of N-methyl pyrrolidone to clean any rust or grease off the surface. The steel panels were removed from the bath after 15 hours.

After rinsing with tap water, the panels were wiped dry with a paper towel, and quickly rinsed with acetone to prevent any flash rusting from occurring as the water evaporated off of the panels. The panels were set out at room temperature to air dry for 48 hours prior to any paint being applied to their surfaces.

A thin film (about 0.010 inch thick) of the paint/solvent retained that was saved from the distillation carried out in Example 2, was applied in a 2–3 inch wide strip down the middle of one of the mild steel panels described above. The paint was applied with a polyester bristle brush. The paint was of the panel long enough to allow for it to flow together and fill in any open spaces or brush marks on the film surface, prior to being placed into the oven for curing. The panel was labeled 5B.

A thin film (about 0.010 inch thick) of the paint/solvent retained that was saved from the distillation carried out in Example 3, was applied in a 2–3 inch wide strip down the middle of one of the mild steel panels described above using the method described above with respect to panel 5B. This panel was labeled 5C.

A thin film (about 0.010 in thick) of the paint/solvent retained that was saved from the distillation carried out in Example 4, was applied to one of the mild steel panels described above, in a 2–3 inch wide strip down the middle of the panel using the method described above with respect to panel 5B. This panel was labeled 5D.

Panels 5B, 5C and 5D were placed onto the bottom shelf of a forced air convection oven, that had the temperature already pre-heated, and set at 140° C.±5° C.

The samples were removed from the oven after 1 hour and 40 minutes time. The samples were allowed to cool down to room temperature, and in 2 hours time after exiting the oven, the following observations were made:

Paint 5B—cured into a hard polymeric film.

Paint 5C—cured into a hard polymeric film.

Paint 5D—cured into a hard polymeric film.

Whereas particular embodiments of the invention have been described above for purposes of illustration, it will be appreciated by those skilled in the art that numerous variations of the details may be made without departing from the invention as described in the appended claims.

What we claim is:

1. An aqueous paint spray booth flood sheet composition flowing in contact with an airstream in which uncured paint particles are entrained, said flood sheet composition consisting essentially of:

(a) about 10 to 45 percent by weight of N-methyl pyrrolidone;

(b) about 15 to about 40 percent by weight of at least one alkyl glycol alkyl ether having an alkyl glycol moiety and an alkyl moiety containing about 1 to 4 carbon atoms connected to the alkyl glycol moiety through an ether linkage;

(c) about 0.1 to about 2.0 percent by weight of a non-ionic linear alcohol ethoxylate surfactant sufficient to reduce the vapor pressure of the flood sheet composition; and (d) the balance, water, wherein said uncured paint particles in said air stream are captured by said flowing flood sheet for subsequent separation therefrom and reuse.

2. The flood sheet composition as in claim 1, wherein component (b) is an alkyl glycol mono alkyl ether.

3. The flood sheet composition as in claim 1 or 2, wherein in component (b) the alkyl glycol moiety is an alkyl glycol oligomer containing 1, 2, or 3, $C_1$ to $C_8$ repeating units which are terminated at each end by a hydroxy group.

4. The flood sheet composition as in claim 3, wherein component (b) is tripropylene glycol mono methyl ether.

5. The flood sheet composition as in claim 1, wherein component (a) and component (b) are present in the composition in an amount substantially the same by weight.

6. The flood sheet composition as in claim 1, wherein component (a) is present in an amount between about 20 to 30 percent by weight.

7. The flood sheet composition as in claim 1, wherein component (b) is present in an amount between about 20 to 30 percent by weight.

8. The flood sheet composition as in claim 1, wherein the surfactant of component (c) is present in an amount between about 0.5 to about 1.0 weight percent.

* * * * *